July 29, 1924.
W. P. GARDNER
1,503,360
AUTOMATIC LAWN WATERING MACHINE
Filed Nov. 30, 1923   3 Sheets--Sheet 1
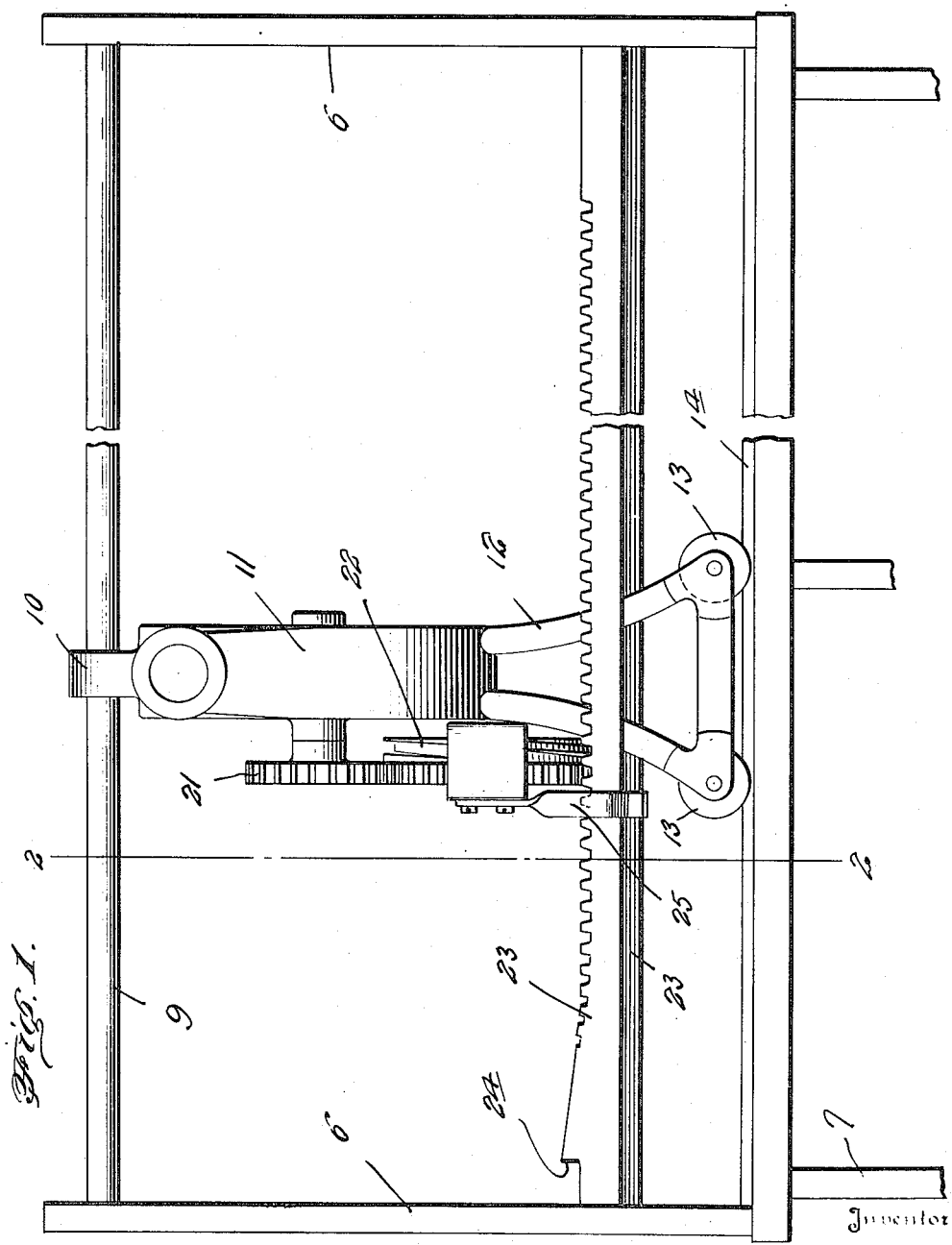

July 29, 1924.
W. P. GARDNER
1,503,360
AUTOMATIC LAWN WATERING MACHINE
Filed Nov. 30, 1923   3 Sheets-Sheet 2
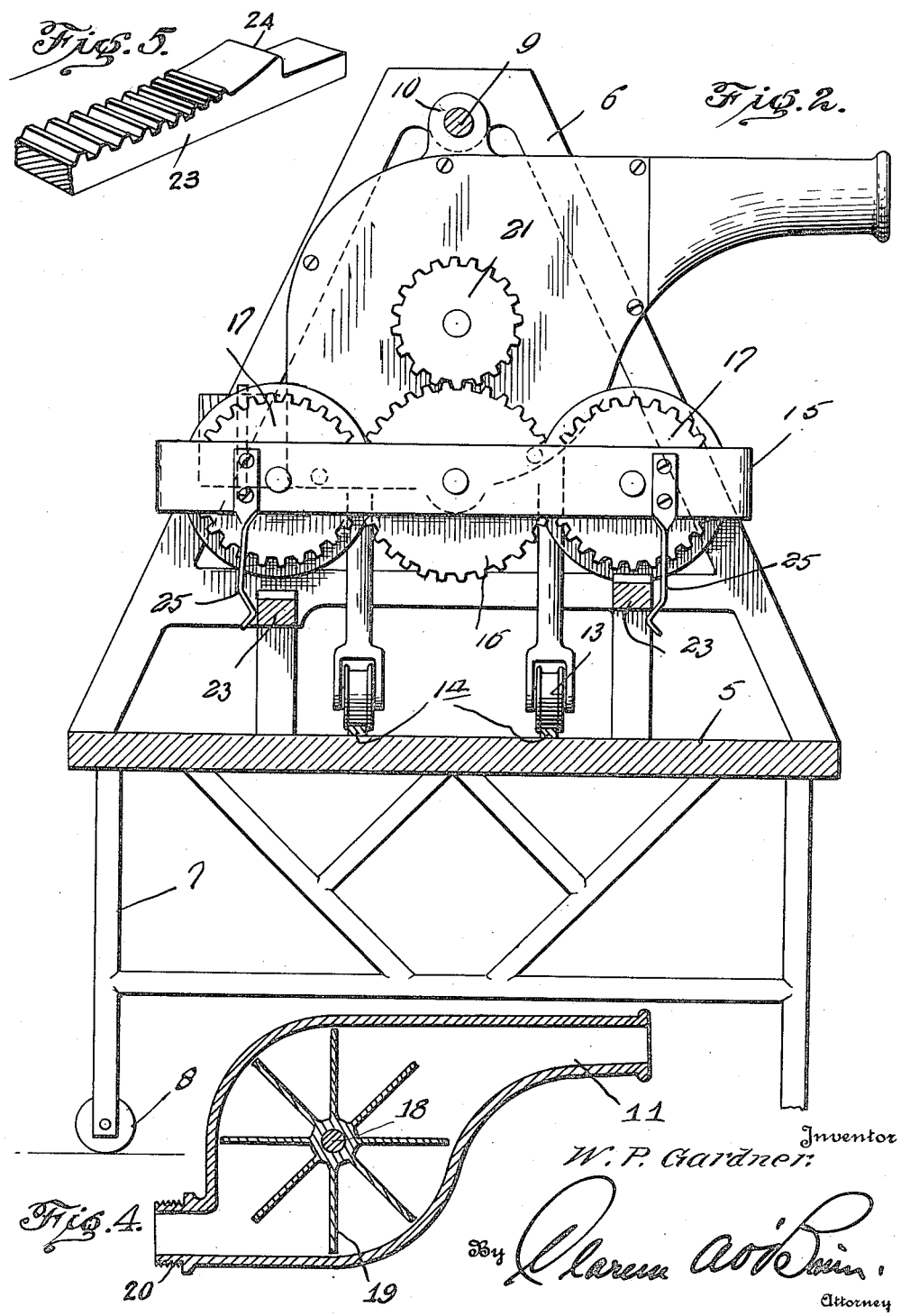

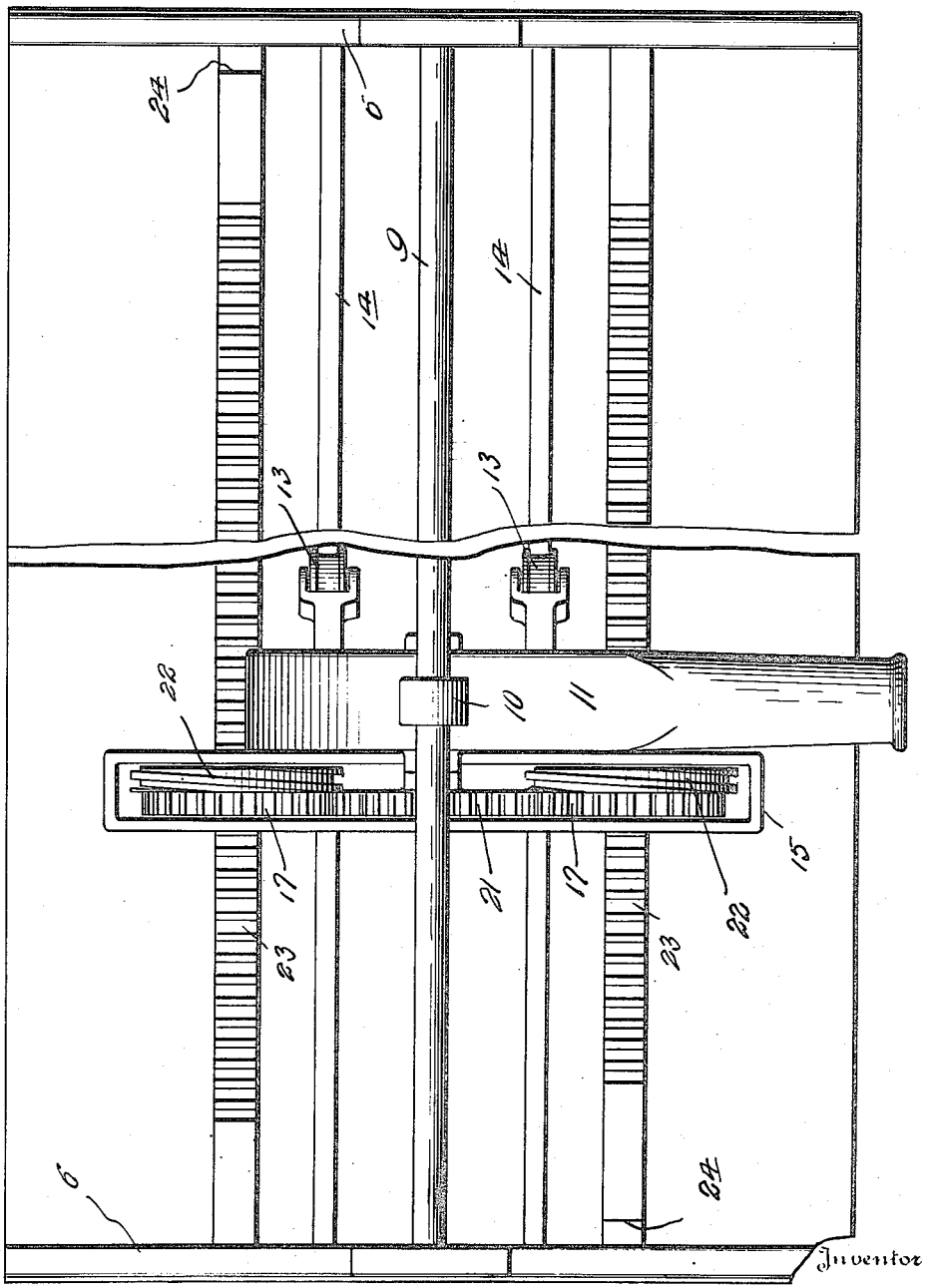

Patented July 29, 1924.

1,503,360

UNITED STATES PATENT OFFICE.

WILLIAM P. GARDNER, OF GOVERNORS ISLAND, NEW YORK.

AUTOMATIC LAWN-WATERING MACHINE.

Application filed November 30, 1923. Serial No. 677,727.

*To all whom it may concern:*

Be it known that I, WILLIAM P. GARDNER, a citizen of the United States, residing at Governors Island, in the county of New York and State of New York, have invented certain new and useful Improvements in Automatic Lawn-Watering Machines, of which the following is a specification.

This invention relates to a watering or sprinkling machine and has more particular reference to a means whereby relatively great areas of lawns or fields may be watered without requiring the attention of an operator.

The primary object of this invention resides in the provision of such a machine wherein the same includes an outlet nozzle for the water that is rectilineally movable in opposite directions upon a portable stand and this automatically, the movement of the nozzle being occasioned by the flow of water therethrough.

An additional object of my invention is to provide such an automatic lawn watering machine that may be manufactured, marketed and operated at relatively small cost, the invention comprising comparatively speaking, but few parts and these co-related in such a manner as to substantially reduce the possibility of disarrangement to a minimum.

With the above and other objects in view as the nature of the invention is better understood, the same comprises the novel form, combination and arrangement of parts hereinafter more fully described, shown in the accompanying drawings and claimed.

In the drawings wherein like reference characters indicate corresponding parts throughout the several views, Figure 1 is a fragmentary front elevational view of my improved watering machine, Figure 2 is a detail vertical sectional view thereof, Figure 3 is a top plan view of an automatic watering machine constructed in accordance with this invention, Figure 4 is an enlarged detail sectional view through the water outlet nozzle per se, and Figure 5 is an enlarged perspective of one end of one of the stationary rack bars comprised in my invention.

Now having particular reference to the drawings, my novel automatic watering machine embodies the provision of a stand that includes a base board 5 and skeleton substantially triangular shaped end walls 6. This stand is preferably of a relatively elongated nature and is supported above the surface of the ground through the medium of end standards 7 that carry ground rollers 8 for permitting the stand to be easily moved from place to place.

Between the skeleton substantially triangular shaped end walls 6 is a horizontal rod 9 slidable upon which is a collar 10 formed upon the top side of a desirable form of water discharge nozzle 11, Figures 1, 2, 3 and 4. Formed upon the bottom side of said nozzle 11 are a pair of spaced pendant legs 12 each of which carries a pair of flanged rollers 13 that have rolling contact with a pair of spaced guide strips 14 appropriately secured to the top face of said bottom board 5 of the automatic watering machine stand.

Pivoted intermediate its ends to one face of the water discharge nozzle 11 and this adjacent its lower edge is an elongated open gear carrying frame 15 centrally within which is journaled a relatively large spur gear 16, at opposite sides of which are other spur gears 17 and in mesh therewith, these last mentioned gears being also journaled within the frame 15 and at points adjacent its opposite ends.

Extending through the nozzle 11 centrally of its enlarged portion as more clearly shown in Figure 4, is a shaft 18 upon which is keyed a water wheel 19 within said enlarged portion of the nozzle and that is adapted to be rotated by the water entering therein preferably through the medium of a flexible hose, not shown, connected to the nozzle at its inlet designated 20.

One end of the before mentioned shaft 18 extends outwardly through the nozzle and is equipped with a relatively small spur gear 21 that has mesh with the relatively large spur gear 16 centrally within the gear carrying frame 15.

The gears 17—17 journaled within opposite ends of the frame 15, are formed upon their inner faces with worm gears 22 adapted to intermesh with the teeth of longitudinal rack bars 23 supported in position between the skeleton end walls 6 of the watering machine stand and at different elevations with respect to the bottom wall 5 thereof, Figure 2.

Opposite ends of the rack bars 23—23 are formed upon their upper edges with inclined portions 24, the lower ends of which are toothed as shown in Figure 1 and that serve as a means for swinging the gear frame 15 upon its pivot in opposite directions for manifestly intermeshing the opposite worm wheel 22 with its rack bar for occasioning the return movement of the nozzle after the same has reached its limit of movement in one direction.

Secured to the gear frame 15 adjacent opposite ends thereof and pendant therefrom are spring clips 25 the lower ends of which have contact with the outer surfaces of the rack bars 23—23 and serve as a means for maintaining the proper worm wheel 22 intermeshed with its complementary rack bar 23.

It will thus be seen that I have provided a highly novel and simplified form of automatic lawn watering machines and one wherein the outlet nozzle thereof will be efficiently rectilineally moved in opposite directions through the action of the water passing therethrough for thereby overcoming the necessity of an operator directing the movement of the water outlet nozzle manually.

Numerous advantages of a machine of this character will be appreciated by those skilled in the art and even though I have herein set forth the most practical embodiment of the invention with which I am at the present time familiar, it is nevertheless to be understood that minor changes may be made within the invention without departing from the spirit and scope of the appended claims.

Having thus described my invention, what I claim as new and desire to secure by Letters Patent is:—

1. In an automatic watering machine of the character set forth, a stand, a fluid discharge nozzle rectilineally movable in opposite directions upon said stand and adapted for connection with a source of fluid supply, a water wheel within said nozzle and adapted to be rotated by the passage of the fluid therethrough, means operatively connected to said water wheel whereby said nozzle is automatically rectilineally moved in opposite directions upon said stand, said means comprising a gear frame pivotally connected to said nozzle and within which is journaled a central and a pair of end gears, said central gear being operatively connected to the water wheel within the nozzle, worm gears carried by said end gears, longitudinal rack bars carried by said stand and supported at different elevations and adapted to be engaged by said worm wheel, and means for automatically swinging said gear frame upon its pivot for alternately engaging said worm wheels with their respective rack bars.

2. In an automatic watering machine of the character set forth, a stand, a fluid discharge nozzle rectilineally movable in opposite directions upon said stand and adapted for connection with a source of fluid supply, a water wheel within said nozzle and adapted to be rotated by the passage of the fluid therethrough, means operatively connected to said water wheel whereby said nozzle is automatically rectilineally moved in opposite directions upon said stand, said means comprising a gear frame pivotally connected to said nozzle and within which is journaled a central and a pair of end gears, said central gear being operatively connected to the water wheel within the nozzle, worm gears carried by said end gears, longitudinal rack bars carried by said stand and supported at different elevations and adapted to be engaged by said worm wheel, means for automatically swinging said gear frame upon its pivot for alternately engaging said worm wheels with their respective rack bars, said means comprising inclined portions at opposite ends of the rack bars and upon which said worm gears are adapted to rise.

3. In an automatic watering machine of the character set forth, a stand, a fluid discharge nozzle rectilineally movable in opposite directions upon said stand and adapted for connection with a source of fluid supply, a water wheel within said nozzle and adapted to be rotated by the passage of the fluid therethrough, means operatively connected to said water wheel whereby said nozzle is automatically rectilineally moved in opposite directions upon said stand, said means comprising a gear frame pivotally connected to said nozzle and within which is journaled a central and a pair of end gears, said central gear being operatively connected to the water wheel within the nozzle, worm gears carried by said end gears, longitudinal rack bars carried by said stand and supported at different elevations and adapted to be engaged by said worm wheel, means for automatically swinging said gear frame upon its pivot for alternately engaging said worm wheels with their respective rack bars, said means comprising inclined portions at opposite ends of the rack bars and upon which said worm gears are adapted to rise, and automatic means for positively maintaining the different worm gears in mesh with their respective rack bars.

In testimony whereof I affix my signature.

WILLIAM P. GARDNER.